US009244181B2

(12) United States Patent
Rickett et al.

(10) Patent No.: US 9,244,181 B2
(45) Date of Patent: Jan. 26, 2016

(54) FULL-WAVEFORM INVERSION IN THE TRAVELTIME DOMAIN

(75) Inventors: James Rickett, Cambridge (GB); Paul Childs, Cambridge (GB)

(73) Assignee: WesternGeco L.L.C., Houston, TX (US)

(*) Notice: Subject to any disclaimer, the term of this patent is extended or adjusted under 35 U.S.C. 154(b) by 1012 days.

(21) Appl. No.: 12/581,372

(22) Filed: Oct. 19, 2009

(65) Prior Publication Data

US 2011/0090760 A1     Apr. 21, 2011

(51) Int. Cl.
*G01V 1/28* (2006.01)

(52) U.S. Cl.
CPC .......... *G01V 1/282* (2013.01); *G01V 2210/679* (2013.01)

(58) Field of Classification Search
CPC ................... G01V 1/282; G01V 2210/679
USPC .......... 367/27, 38, 51, 56, 73, 14; 702/16, 18, 702/14; 324/323; 703/5
See application file for complete search history.

(56) References Cited

U.S. PATENT DOCUMENTS

| 4,953,140 | A | 8/1990 | Dablain |
| 4,953,142 | A | 8/1990 | Rimmer |
| 4,964,088 | A * | 10/1990 | Chittineni ................. 367/51 |
| 5,343,440 | A | 8/1994 | Kan et al. ................. 367/27 |
| 6,925,387 | B2 * | 8/2005 | Marin et al. .............. 702/16 |
| 7,117,093 | B2 * | 10/2006 | Stinson et al. ............ 702/14 |
| 7,167,414 | B2 * | 1/2007 | Lee et al. ................. 367/51 |
| 7,196,969 | B1 | 3/2007 | Karazincir |
| 7,373,252 | B2 | 5/2008 | Sherrill et al. |
| 2006/0072373 | A1 * | 4/2006 | Lee et al. ................. 367/51 |
| 2007/0005253 | A1 * | 1/2007 | Fornel et al. ............. 702/14 |
| 2007/0104028 | A1 * | 5/2007 | Van Manen et al. ..... 367/38 |
| 2009/0213692 | A1 * | 8/2009 | Martinez et al. ......... 367/52 |

OTHER PUBLICATIONS

Beydoun, First Born and Rytov Approximations: Modeling and Inversion Conditions in a Canonical Example, Journal of Acoustical Society of America, Mar. 1988, pp. 1045-1055, vol. 83, No. 3.
Biondi, et al., "Focusing" Eikonal Equation and Global Tomography, Stanford Exploration Project, Report SERGEY, Nov. 9, 2000, pp. 403-417.
Brenders, Waveform Tomography of 2-D Seismic Data in a Canadian Foothills-Data Preconditioning by Exponential Time-Damping, 71st EAGE Conference and Exhibition, Jun. 8-11, 2009.
Choi, et al., Frequency-Domain Elastic Full Waveform Inversion using the New Pseudo-Hessain Matrix: Experience of Elastic Marmousi-2 Synthetic Data, Bulletin of the Seismological Society of America, pp. 2402-2415, vol. 98, No. 5.

(Continued)

*Primary Examiner* — Daniel L Murphy
(74) *Attorney, Agent, or Firm* — Abimbola Bukoye

(57) ABSTRACT

A method for processing seismic data. The method includes predicting seismic data according to an earth model representing seismic properties of subterranean formations in the earth, determining a difference between seismic data acquired from one or more seismic receivers and the predicted seismic data, projecting the difference into a model space in traveltime, and updating the earth model according to the projected difference. As a result, the updated earth model more accurately represents the seismic properties of subterranean formations in the earth.

28 Claims, 4 Drawing Sheets

(56) References Cited

OTHER PUBLICATIONS

Crase, et al., Robust Elastic Nonlinear Waveform Inversion: Application to Real Data, Geophysics, May 1990, pp. 527-538, vol. 55, No. 5.

Hu, et al., Preconditioned Non-Linear Conjugate Gradient Method for Seismic Full-Waveform Inversion, 71st EAGE Conference and Exhibition, Jun. 8-11, 2009.

Pratt, et al., Gauss-Newton and Full Newton Methods in Frequency-Space Seismic Waveform Inversion, Geophysical Journal International, 1998, pp. 341-362, vol. 133.

Riyanti, A Parrallel Multigrid-Based Preconditioner for the 3D Heterogeneous High-Frequency Helmholtz Equation, Journal of Computational Physics, 2007, pp. 431-448, vol. 224.

Shipp, et al., Two-Dimensional Full Wavefield inversion of Wide-Aperature Marine Seismic Streamer Data, Geophysical Journal International, 2002, pp. 325-344, vol. 151.

Sirgue, et al., Efficient Waveform Inversion and Imagine: A Strategy for Selecting Temporal Frequencies, Geophysics, Jan.-Feb. 2004, pp. 231-248, vol. 69, No. 1.

Wang, et al., Reflection Seismic Waveform Tomography-Imaging Schemes, 71st EAGE Conference and Exhibition, Jun. 8-11, 2009.

Clapp, et al., Tau Domain Migration Velocity Analysis using Angle CRP Gathers and Geologic Constraints,SEG, 2000.

Clapp, et al., Short Note: Why Tau Tomography is Better than Depth Tomography, Stanford Exploration Project, Report 100, Apr. 20, 1999, pp. 51-58.

Sevink, et al., Three-Dimensional, Nonlinear, Asymptotic Seismic Inversion, Inverse Problems, 1996, pp. 757-777, vol. 12.

Snieder, et al., Retrieving both the Impendance Contrast and Background Velocity: A Global Strategy for the Seismic Reflection Problem, Geophysics, Aug. 1989, pp. 991-1000, vol. 54, No. 8.

Vigh, et al., Developing Earth Models with Full Waveform Inversion, The Leading Edge, Apr. 2009, pp. 432-435.

Lee, 3-D Full Waveform Inversion of Seismic Data; Part 1. Theory, University of California, 2003.

International Search Report and Written Opinion of PCT Application No. PCT/US2010/053083 dated Jun. 30, 2011: pp. 1-12.

Biondi et al., "'Focusing' eikonal equation and global tomography," Stanford Exploration Project, Report 95, Oct. 1997: pp. 61-76.

EP 10825480.6 European Search Report, dated Jul. 3, 2014, 7 pages.

* cited by examiner

FULL-WAVEFORM INVERSION IN THE TRAVELTIME DOMAIN

BACKGROUND

1. Field of the Invention

Implementations of various technologies described herein generally relate to seismic data processing.

2. Description of the Related Art

The following descriptions and examples are not admitted to be prior art by virtue of their inclusion within this section.

Seismic exploration is widely used to locate and/or survey subterranean geological formations for hydrocarbon deposits. Since many commercially valuable hydrocarbon deposits are located beneath areas of land and bodies of water, various types of land and marine seismic surveys have been developed.

In a typical land or marine seismic survey, seismic sensors are installed in specific locations around an area of the earth in which hydrocarbon deposits may exist. Seismic sources, such as vibrators or air guns, may move across the area and produce acoustic signals, commonly referred to as "shots," directed down to the earth, where they are reflected from the various subterranean geological formations. Reflected signals are received by the sensors, digitized, and then transmitted to a survey database. The digitized signals are referred to as seismic data. The ultimate aim of this process is to build a representation of the subterranean geological formations beneath the surface of the earth. Analysis of the representation may indicate probable locations of hydrocarbon deposits in the subterranean geological formations.

Full-waveform inversion (FWI) is one approach in analyzing the seismic data. Specifically, FWI is an approach to build a seismic velocity earth model that minimizes a misfit between seismic data received by sensors and predicted seismic data obtained from an earth model. Since the misfit is sensitive to both the amplitude and phase of the seismic data, FWI has the potential to deliver velocity earth models with higher resolution than conventional earth modeling techniques. Furthermore, given modern optimization techniques, FWI now has the potential to work with minimal user input. This has significant advantages over conventional velocity earth model building practices in complex areas such as salt provinces, which involve manually intensive workflows.

SUMMARY

Described herein are implementations of various technologies for performing a full-waveform inversion in the traveltime domain. In one implementation, a method for performing a full-waveform inversion may include predicting seismic data based on an earth model representing seismic properties of subterranean formations in the earth. The predicted seismic data may then be compared to the actual seismic data acquired from seismic receivers to determine a difference between the predicted and the actual seismic data. The difference between the predicted and the actual seismic data may then be projected into a model space in traveltime, and the earth model may be updated according to the projected difference. As a result, the updated earth model may more accurately represent the seismic properties of the subterranean formations in the earth.

In another implementation, a computer-readable storage medium may predict seismic data according to an earth model that may represent the seismic properties of subterranean formations in the earth. The computer-readable storage medium may then determine a difference between actual seismic data acquired from one or more seismic receivers and the predicted seismic data. The computer-readable storage medium may then project a difference between the seismic data and the predicted seismic data into a model space in depth and then project the difference in depth into a model space in traveltime. The computer-readable storage medium may use the projected difference between the actual and predicted seismic data in traveltime to update the earth model such that the updated earth model may more accurately represent the seismic properties of the subterranean formations in the earth.

In yet another implementation, a computer system may include a memory with program instructions to cause a processor to predict seismic data according to an earth model in depth. The earth model in depth may represent seismic properties of subterranean formations in the earth. The computer system may determine a difference between actual seismic data that was acquired from one or more seismic receivers and the predicted seismic data. The computer system may then transform the earth model in depth to an earth model in traveltime and update the earth model in traveltime using the difference between the between actual and predicted seismic data.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
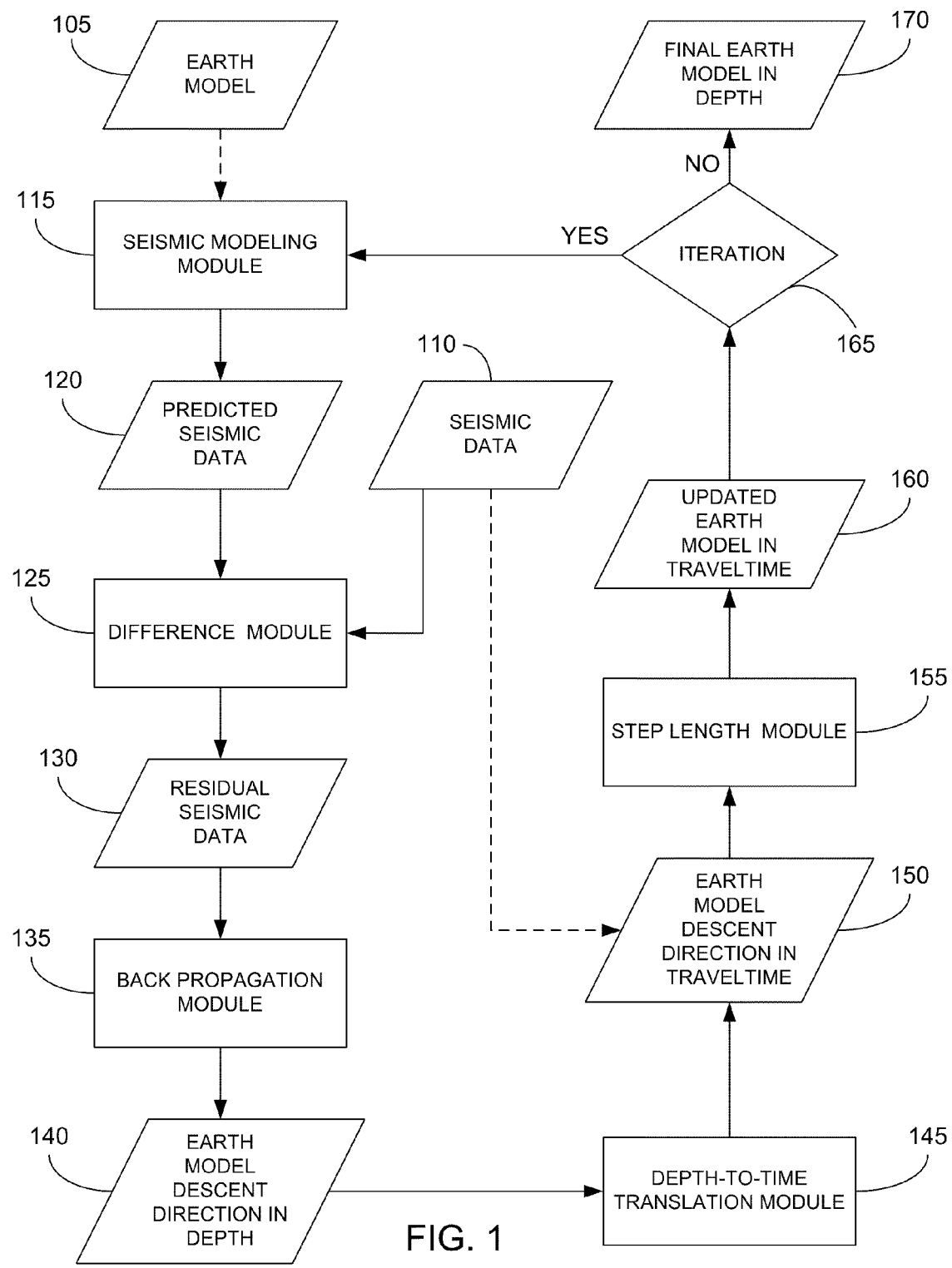
FIG. 1 illustrates a data flow diagram of a method for performing a full-waveform inversion in the traveltime domain in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at performing a full-waveform inversion in the traveltime domain.

In one implementation, a method for performing a full-waveform inversion in the traveltime domain may begin with receiving an earth model in depth. The earth model in depth may be expressed in terms of spatial (horizontal) coordinates and depth. In addition to receiving the earth model in depth, the method may include receiving seismic data that has been acquired from seismic receivers. The seismic data may contain seismic responses to seismic sources that may have been obtained from the relatively same geographical area of the earth represented by the earth model in depth. The seismic data is typically presented in a data space domain defined by the location of the seismic receivers and either a time coordinate or a transform thereof, such as temporal frequency.

Upon receiving the earth model in depth, seismic data may be simulated according to the earth model in depth. The simulated seismic data may represent the seismic data that may have been obtained from the geographical area of the earth represented in the earth model in depth. As such, the simulated seismic data may be referred to as the predicted seismic data. The predicted seismic data may be presented in the same data-space domain as the seismic data.

The seismic data may then be subtracted from the predicted seismic data in order to determine a residual seismic data. The residual seismic data may be propagated backward in time in the earth model in depth to produce a back-propagating wavefield of the residual seismic data. Additionally, a model for the seismic sources may be introduced or injected into the earth model in depth and may also be propagated forward in time to produce a forward-propagating source wavefield. The back-propagated wavefield of the residual seismic data may then be cross-correlated with the forward propagating source wavefield to create an earth model descent direction in depth. The earth model descent direction in depth may be described as a projection of the residual seismic data into a model space having spatial coordinates and depth.

The depth coordinates of the earth model descent direction in depth may then be translated into traveltimes to determine an earth model descent direction in traveltime. In one implementation, the earth model descent direction in traveltime may be obtained by applying an adjoint of the Jacobian of the time-to-depth function to the earth model descent direction in depth. In this manner, a potential update to the seismic properties of the subterranean formations in the earth may be presented in the earth model descent direction in traveltime.

The earth model descent direction in traveltime may then be multiplied with a step length. The step length may be an estimate of the distance in the descent direction in which the earth model in depth may be updated. In order to update the earth model in depth, the earth model in depth may first be transformed or converted into an earth model in traveltime. After determining the earth model in travel time, the product of the earth model descent direction in traveltime and the step length may be added to the earth model in traveltime to create an updated earth model in traveltime. The updated earth model in traveltime may then be converted into an updated earth model in depth, and the above process is repeated iteratively until the updated earth model in depth meets certain conditions. Accordingly, the updated earth model in depth may continuously be updated to more accurately reflect the corresponding subterranean formations in the earth.

Various techniques for performing a full-waveform inversion in the traveltime domain will now be described in more detail with reference to FIGS. 1-4 in the following paragraphs.

FIG. 1 illustrates a data flow diagram of a method for performing a full-waveform inversion in the traveltime domain in accordance with implementations of various techniques described herein. In one implementation, an earth model 105 is input into a seismic modeling module 115. The earth model 105 may be obtained using conventional seismic data processing techniques, such as velocity analysis, reflection or refraction tomography, extrapolation of well log information, statistical modeling, and the like.

The earth model 105 may represent the seismic properties of subterranean formations in the earth (e.g., P-wave velocity, density, S-wave velocity, seismic anisotropy parameters, seismic attenuation parameters) in a model space domain having spatial coordinates and depth or having spatial coordinates and traveltimes. The earth model may include acoustic properties of the subterranean formations in the earth such as velocities, densities, anisotropic and anelastic properties or elastic properties having a parameter that is a function of a shear modulus. The earth model 105 may also include parameters that describe the velocity of seismic wave propagation. The parameters may be updated at every physical scale represented by in the earth model. In one implementation, the model space domain of the earth model 105 may depend on how the earth model 105 has been obtained. The earth model 105 expressed in terms of spatial coordinates (e.g., x, y coordinates) and depth (e.g., z coordinate) may be referred to as an earth model in depth. The earth model in depth may represent the seismic properties of subterranean formations in the earth at various depths of the earth. The earth model 105 expressed in terms of spatial coordinates and traveltimes may be referred to as an earth model in traveltime. The traveltime may represent an amount of time between when a seismic wave travels from its source to a receiver such that the seismic wave has reflected from a subsurface interface. The receiver may be located relatively near the source.

In addition to receiving the earth model 105, the method may include receiving seismic data acquired from one or more seismic receivers in a seismic survey, which may be referred to as seismic data 110. The seismic data 110 may contain seismic responses to seismic sources such as seismic reflection traveltimes. The seismic data 110 may be obtained from the relatively same geographical area of the earth in which the earth model 105 represents. In one implementation, the seismic data 110 may be presented in a data space domain defined by the location of the seismic receivers and either a time coordinate or a transform thereof, such as temporal frequency. The seismic data 110 may also be presented in a time or frequency domain.

After the earth model 105 is input into the seismic modeling module 115, the seismic modeling module 115 may use earth model 105 to predict the seismic data or seismic responses that may have been obtained in the area of the earth defined in the earth model 105. This may be accomplished by finding the numerical solution of a wave-equation. For example, for acoustic full-waveform inversion, the wave-equation may be $$\frac{1}{\rho v^2} \frac{\partial^2 P}{\partial t^2} = \left[ \frac{\partial}{\partial x}\left(\frac{1}{\rho}\frac{\partial P}{\partial x}\right) + \frac{\partial}{\partial y}\left(\frac{1}{\rho}\frac{\partial P}{\partial y}\right) + \frac{\partial}{\partial z}\left(\frac{1}{\rho}\frac{\partial P}{\partial z}\right) \right] + S$$

where P is the pressure, p is the density and v is the seismic velocity.

In one implementation, if the earth model 105 is represented in the model space having spatial coordinates and traveltimes, the earth model 105 may be designated as a current earth model in traveltime. If, however, the earth model 105 is represented in the model space having spatial coordinates and depth, the seismic modeling module 115 may transform the earth model 105 via an inverse of the time-to-depth function into the current earth model in traveltime.

In one implementation, the time-to-depth function may convert earth models parameterized by traveltime into earth models parameterized by depth. In this manner, the time-to-depth function may be mathematically defined as g, such that:

$$m = g(\hat{m}) \quad \text{(Equation 1)}$$

where m is the earth model in depth, and $\hat{m}$ is the current earth model in traveltime. The time-to-depth function maps properties in the earth model in traveltime to properties in the earth model in depth via time-to-depth curves. For example, for a property from the earth model in traveltime, $\hat{c}(x, y, \tau)$, the time-to-depth function would output an equivalent property in depth:

$$c(x,y,z) = \hat{c}[x,y,\tau(x,y,z)] $$

where $\tau(x,y,z)$ describes the time-to-depth curves at every spatial (x,y) location. In one implementation, the time-to-depth curve may be computed by a two-step process: first, by calculating depth-to-time curves by integrating half velocity over traveltime to produce depth as a function of two-way traveltime:

$$z(x, y, \tau) = \int_0^\tau \frac{v(x, y, \tau')}{2} d\tau'; \quad \text{(Equation 2)}$$

and second, by inverting the depth-to-time curves to produce time-to-depth curves at every spatial location (i.e., calculating $\tau(x,y,z)$ from $z(x,y,\tau)$). The depth-to-time curves are monotonically increasing functions. Linear interpolation may be used to preserve the monotonicity of the function, and fine-sampling in $\tau$ may be used to ensure it is sufficiently accurate. The time-to-depth function may be linearized such that the gradients with the Jacobian can be calculated for a back propagation module 135, which will be described in more detail in the paragraphs below.

The linearization of this function has two terms. The first term is a local contribution: a perturbation in earth model parameters in time that causes a similar perturbation in the depth model. The second term is a non-local contribution: a perturbation in velocity that will cause a perturbation at any point below where there is a contrast in earth model properties. In one implementation, the second term will (partially) cancel non-local terms in the seismic modeling, leaving the modeled data sensitive to local earth model perturbations.

Upon obtaining the current earth model in traveltime, the seismic modeling module 115 may then convert the current earth model in traveltime into a current earth model in depth. In one implementation, converting the current earth model in traveltime into the current earth model in depth may be done by vertically stretching the data in the current earth model in traveltime based on the vertical P-wave velocity. Upon obtaining the current earth model in depth, the seismic modeling module 115 may simulate the seismic data that may have been obtained from the geographical area of the earth represented in the current earth model in depth. The output of the seismic modeling module 115 is a simulated seismic data or predicted seismic data 120. In one implementation, the predicted seismic data 120 may be in the same data-space domain as the seismic data 110 as described above (i.e., defined by the location of the seismic receivers and either a time coordinate or a transform thereof, such as temporal frequency). The predicted seismic data may include multiple reflections and reverberations with respect to the earth model 105.

The seismic data 110 and the predicted seismic data 120 may then be input into a difference module 125 in order to determine the differences between the seismic data 110 and the predicted seismic data 120. The difference module 125 may subtract the seismic data 110 from the predicted seismic data 120. In one implementation, the difference module 125 may also apply some additional filtering or windowing to the seismic data 110 and the predicted seismic data 120. The output of the difference module 125 is a residual seismic data 130. The residual seismic data 130 may represent the differences between the seismic data 110 and the predicted seismic data 120.

A norm/metric of the residual seismic data 130 may be described as the misfit, E, between the seismic data 110 and the predicted seismic data 120. In this manner, the method described here in FIG. 1 is based on minimizing a misfit, E, between the seismic data 110 (d) and the predicted seismic data 120 (f(m)) with respect to the current earth model (m). The difference module 125 may determine the residual seismic data 130 or the misfit, E, using a least-square method such that:

$$E = |d - f(m)|^2 \quad \text{(Equation 3)}$$

In terms of the model parameterization defined above in Equation 1, Equation 3 then becomes:

$$E = |d - [g(\hat{m})]|^2 \quad \text{(Equation 4)}$$

Once the residual seismic data 130 is determined, the residual seismic data 130 may then be input into a back propagation module 135. The back propagation module 135 may propagate the residual seismic data 130 backward in time in the current earth model in depth to produce a back-propagating wavefield of the residual seismic data 130. In one implementation, the back propagation module 135 may calculate a descent direction in depth by back projecting the residual seismic data 130 via the adjoint of the wave equation or via the adjoint of the Jacobian of the seismic modeling process, as described in the seismic modeling module 115 above.

The back propagation module 135 may then inject a model of the seismic sources into the current earth model in depth forward in time to produce a forward-propagating source wavefield. Next, the back propagation module 135 may cross-correlate the back-propagating wavefield of the residual seismic data 130 with the forward-propagating source wavefield.

In order to cross-correlate the back-propagating wavefield of the residual seismic data 130 with the forward-propagating source wavefield, the back propagation module 135 may calculate a gradient, g, which involves a projection of the residual seismic data 130 into a model space in depth via the adjoint of the Jacobian such that:

$$g = J^t r \quad \text{(Equation 5)}$$

where J is the Jacobian and r is the residual. The elements of the Jacobian are given by partial derivatives:

$$J_{ij} = \partial f_i / \partial m_j \quad \text{(Equation 6)}$$

The partial derivatives describe the change in the predicted seismic data 120 with respect to a model parameter in depth.

Partial derivatives with respect to the parameterization defined in Equation 1 may be computed as a matrix product via the chain rule:

$$\hat{J}_{ij} = \frac{\partial f_i}{\partial \hat{m}_j} = \frac{\partial f_i}{\partial m_k} \frac{\partial g_k}{\partial \hat{m}_j} \qquad \text{(Equation 7)}$$

where $$\frac{\partial f_i}{\partial m_k}$$

is the Jacobian of the wave equation, and $$\frac{\partial g_k}{\partial \hat{m}_j}$$

is Jacobian of the time-to-depth function. Accordingly, to calculate the gradient with respect to model parameters in time, after applying the adjoint of the Jacobian of the wave-modeling process, the adjoint of the Jacobian of the time-to-depth function may also be applied.

In one implementation, the resulting projection of the residual seismic data 130 into a model space is the earth model descent direction in depth 140. In this manner, the earth model descent direction in depth 140 may be presented in the same space as the current earth model in depth, i.e. with spatial coordinates and depth. The descent direction of the earth model descent direction in depth 140 may be an estimate of the direction in model space from the current earth model in depth to an optimal earth model. The optimal earth model may represent a more accurate earth model than the current earth model in depth.

The earth model descent direction in depth 140 may then be input into a depth-to-time translation module 145. The depth-to-time translation module 145 may translate the depth coordinates of the earth model descent direction in depth 140 to traveltimes. In one implementation, the depth coordinates are translated to traveltimes by applying the adjoint of the Jacobian of the time-to-depth function to the earth model descent direction in depth 140. The time-to-depth function may be derived from a vertical integration of a vertical seismic traveltime or a zero-offset ray propagation. In one implementation, a spatial smoothing may be applied to the time-to-depth function in order to stabilize the time-to-depth function in one or more structurally complex areas. The output of the depth-to-time translation module 145 is an earth model descent direction in traveltime 150. In this manner, a potential update to the seismic properties of the subterranean formations in the earth may be represented in the earth model descent direction in traveltime 150 in a model space having spatial coordinates and traveltimes.

In one implementation, the earth model descent direction in traveltime 150 may be modified based on previous earth model descent directions in traveltime (for example via the Nonlinear Conjugate Gradients (NLCG) algorithm). In another implementation, the earth model descent direction in traveltime 150 may be modified by a preconditioning operator (for example, via an approximate inverse to the Hessian matrix). The purpose of modifying the earth model descent direction in traveltime 150 in either of these ways is to increase the rate of convergence in the corresponding earth model.

The earth model descent direction in traveltime 150 may then be input into a step length module 155. In some implementations, the seismic data 110 may also be input into the step length module 155. The step length module 155 is used to update the current earth model in traveltime. In one implementation, in order to update the current earth model in traveltime, the step length module 155 may obtain a direction in which the current earth model in traveltime will be updated and how far to go into that direction (i.e., appropriate step length). The direction in which the current earth model in traveltime will be updated may be the descent direction of the earth model descent direction in traveltime 140 as obtained from the back propagation module 135. As mentioned above, the descent direction may be an estimate of the direction in model space from the current earth model in traveltime to the optimal earth model. The appropriate step length may describe an estimate of the distance in the descent direction to use in updating the Current Earth Model in Traveltime. As such, the appropriate step length may also be referred to as the distance. In one implementation, the appropriate step length may be embedded within the descent direction when the descent direction is determined using certain algorithms (e.g., Gauss-Newton). In these situations, an explicit step length calculation may be unnecessary and the step length module 155 may simply return 1 as the appropriate step length. In other implementations, the appropriate step length may be determined by the step length module 155 according to a process described in FIG. 3.

Upon determining the appropriate step length, the step length module 155 may multiply the appropriate step length with the earth model descent direction in traveltime 150 and add the resulting product to the current earth model in traveltime to create an updated earth model in traveltime 160. The product of the appropriate step length and the descent direction may define the amount in which the current earth model in traveltime will be updated. The earth model descent direction in traveltime 150 may have the same units/dimensions as the current earth model in traveltime, and the appropriate step length may be physically dimensionless. In this manner, the appropriate step length multiplied by the earth model descent direction in traveltime 150 may also have the same units as the current earth model in traveltime.

Upon determining the updated earth model in traveltime 160, the updated earth model in traveltime 160 may be input into an iteration module 165. The iteration module 160 may then designate the updated earth model in traveltime 160 as the current earth model in traveltime, and the process detailed in FIG. 1 may be repeated iteratively until certain conditions are met. In some implementations, the conditions may include reaching a predetermined maximum number of iterations, obtaining an updated residual seismic data 130 such that it falls below a predetermined value, determining whether the updated earth model in traveltime 160 is within a specified tolerance of the current earth model in traveltime, and the like. If the conditions have not been met, the process detailed in FIG. 1 may be repeated using the updated earth model in traveltime 160 instead of the earth model 105. As such, the updated earth Mmodel in traveltime 160 is input into the seismic modeling module 115 instead of the earth model 105. Accordingly, the updated earth model in traveltime 160 may be continuously updated to more accurately reflect the corresponding seismic properties of subterranean formations in the earth. Upon determining that the certain conditions have been met, the iteration module 165 may exit the iterative process and may translate the current earth model in traveltime into a current earth model in depth to produce a final earth model in depth 170. The final earth model in depth 170 may then be used to create seismic migration models, perform reservoir calculations, determine well exploration sites and the like. Although the final earth model in depth 170 has been described as being in the model space having spatial coordinates and depth, it should be noted that in some implementations, the final earth model may be presented in the model space having spatial coordinates and traveltimes.

In the paper titled, "Retrieving both the impedance contrast and background velocity: A global strategy for the seismic reflection problem," by Snieder, Xie, Pica and Tarantola (Geophysics, 1989), Snieder, Xie, Pica and Tarantola describe a two step process for inverting for an elastic model of the subsurface. First, they invert the elastic model for acoustic impedance at a fixed velocity as a function of horizontal spatial coordinates and traveltime. Then, they invert for velocity as a function of horizontal spatial coordinates and depth for a fixed acoustic impedance. This method assumes that there is a separation of scales. As such, they invert for impedance at high frequencies and velocities at low frequencies.

In contrast to the two-step method described by Snieder, Xie, Pica and Tarantola, the method for performing a full-waveform inversion in the traveltime domain described herein is a one-step process that inverts for velocity and impedance simultaneously (e.g., as a function of traveltime). As such, the method for performing a full-waveform inversion does not just invert for acoustic impedance as a function of traveltime, and velocity is not explicitly held constant. Furthermore, Snieder, Xie, Pica and Tarantola's description of the implementation of their algorithm performs the inversion for impedance using a Born inversion of the near offset trace as opposed to a a full-waveform method as described herein. For full-waveform inversion problem described herein, the data are sensitive to both velocity and impedance at the same scale. Consequently, the method based on separation of scales as described by Snieder, Xie, Pica and Tarantola does not provide any advantage over the method described herein.

In the paper titled, "Three-dimensional, nonlinear, asymptotic seismic inversion," by Sevink and Herman (Inverse Problems, 1996), Sevink and Herman describe another two step approach for seismic inversion with both steps of seismic inversion for high-frequency "contrast" and low frequency velocity which are parameterized by a traveltime metric. The Sevink and Herman method differs from the method for performing a full-waveform inversion described herein in that Sevink and Herman's forward modeling is done with an asymptotic Born algorithm that ignores multiple scattering and reverberations. Furthermore, Sevink and Herman defines a low frequency velocity model according to a very low-order parameterization. Sevink and Herman then suggest to stabilize the inversion by a singular value decomposition which implies that the Jacobian is linked the seismic data with the earth model 105 explicitly, so their approach does not use steps 140 and 145. Steps 140 and 145 provide flexibility in development and application of the full-waveform inversion.

Figure 2:
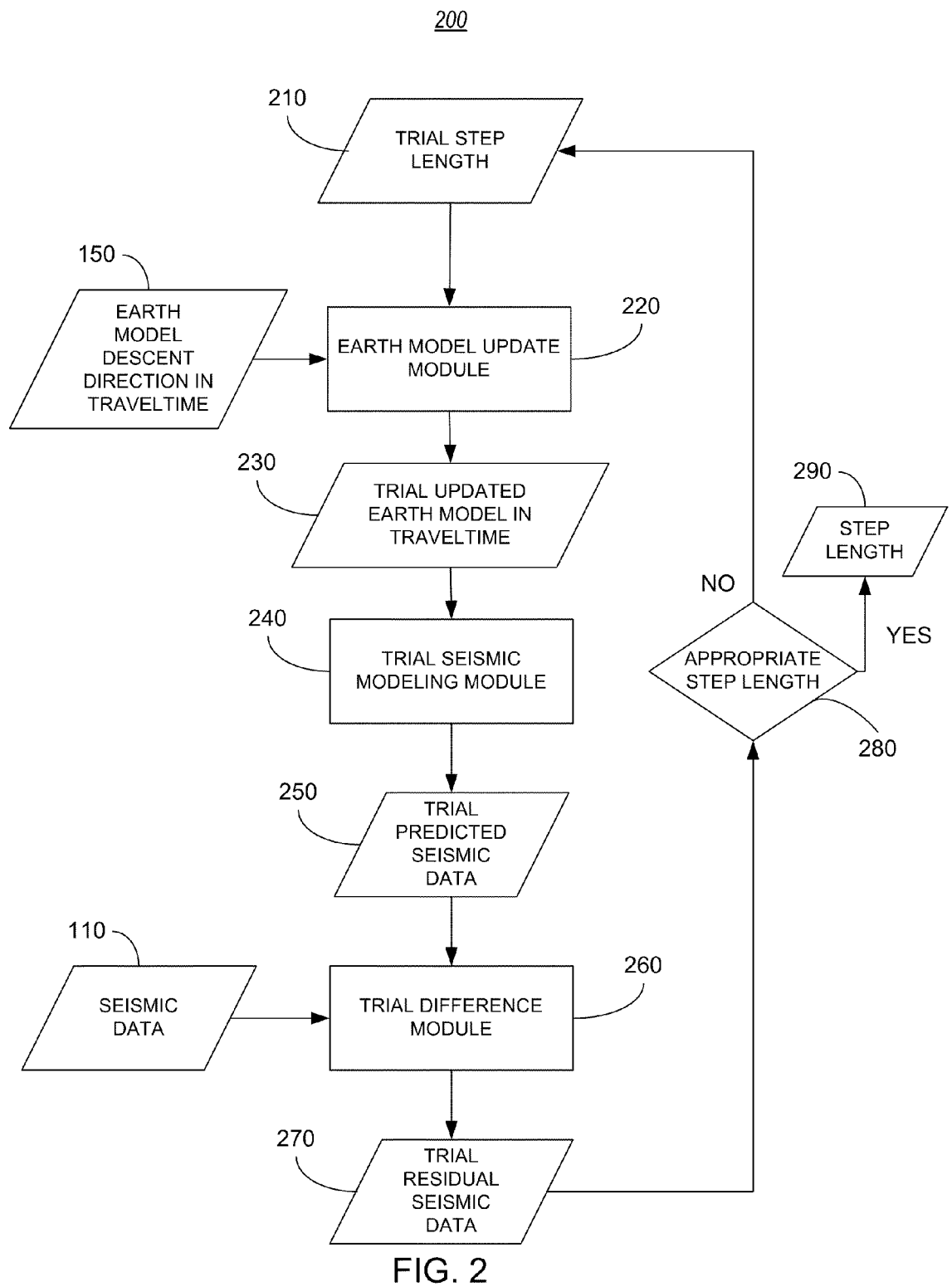
FIG. 2 illustrates a data flow diagram of a method for estimating a step length in accordance with one or more implementations of various techniques described herein.

FIG. 2 illustrates a data flow diagram of a method for estimating a step length in accordance with one or more implementations of various techniques described herein. In order to determine the appropriate step length as defined in FIG. 1, the step length module 155 may first determine a trial step length 210. The trial step length 210 may be generated by the step length module 155 in a number of different ways. For example, the initial step length may be a prescribed percentage of the ratio between an L2 norm of the descent direction and an L2 norm of the current earth model. In one implementation, the trial step length 210 may initially be set to a value of 1. The trial step length 210 may also be referred to as the trial distance.

Upon determining the trial step length 210, the trial step length 210 may be input into an earth model update module 220. The earth model update module 220 may multiply the trial step length 210 with the earth model descent direction in traveltime 150 obtained from the depth-to-time translation module 145 as described in FIG. 1. Upon determining the product of the trial step length 210 and the earth model descent direction in traveltime 150, the earth model update module 220 may add the product to the current earth model in traveltime. The sum resulting from this addition may be referred to as a trial updated earth model in traveltime 230.

The trial updated earth model in traveltime 230 may then be input into a trial seismic modeling module 240. The trial seismic modeling module 240 may be functionally similar to the seismic modeling module 115 as described in FIG. 1. As such, the trial seismic modeling module 240 may first convert the trial updated earth model in traveltime 230 into a trial updated earth model in depth. According to the method described with reference to the seismic modeling module 115, the trial seismic modeling module 240 may then simulate or predict the seismic data that may have been obtained in the geographical area defined by the trial updated earth model in depth. The output of the trial seismic modeling module 240 is the trial predicted seismic data 250.

The trial predicted seismic data 250 is then input into a trial difference module 260. In addition to the trial predicted seismic data 250, the trial difference module 260 may also receive the seismic data 110 as an input. The trial difference module 260 may then subtract the seismic data 110 from the trial predicted seismic data 250 which may use a similar process to calculate a trial residual seismic data 270 as described in the difference module 125 in FIG. 1. The output of the trial difference module 260 is the trial residual seismic data 270. The trial residual seismic data 270 may also be referred to as the trial difference.

The trial residual seismic data 270 may then be input into an appropriate step length module 280 to determine whether the trial step length 210 is an appropriate step length to use in updating the current earth model in traveltime. In one implementation, the appropriate step length module 280 may determine that the trial step length 210 is an appropriate step length by determining whether certain conditions have been met. Examples of when conditions are met include when the norm of the trial residual seismic data 270 falls below a predetermined value, when the trial updated earth model in traveltime 230 is within a specified tolerance from the current earth model in traveltime, and the like.

If the appropriate step length module 280 determines that the step length is not appropriate, a new trial step length 210 will be generated by the step length module 155 and the process described in FIG. 2 will then be repeated using the different trial step length 210. The new trial step length 210 may be generated by increasing, decreasing or by altering the previous trial step length 210 in some manner. The process defined in FIG. 2 may then continue until the step length module 280 deems the trial step length 210 as an appropriate step length. Upon determining the appropriate step length, the appropriate step length module 280 may set the trial step length 210 as the step length 290. The step length 290 may then be used by the step length module 155 described in FIG. 1 as the appropriate step length.

Figure 3A:
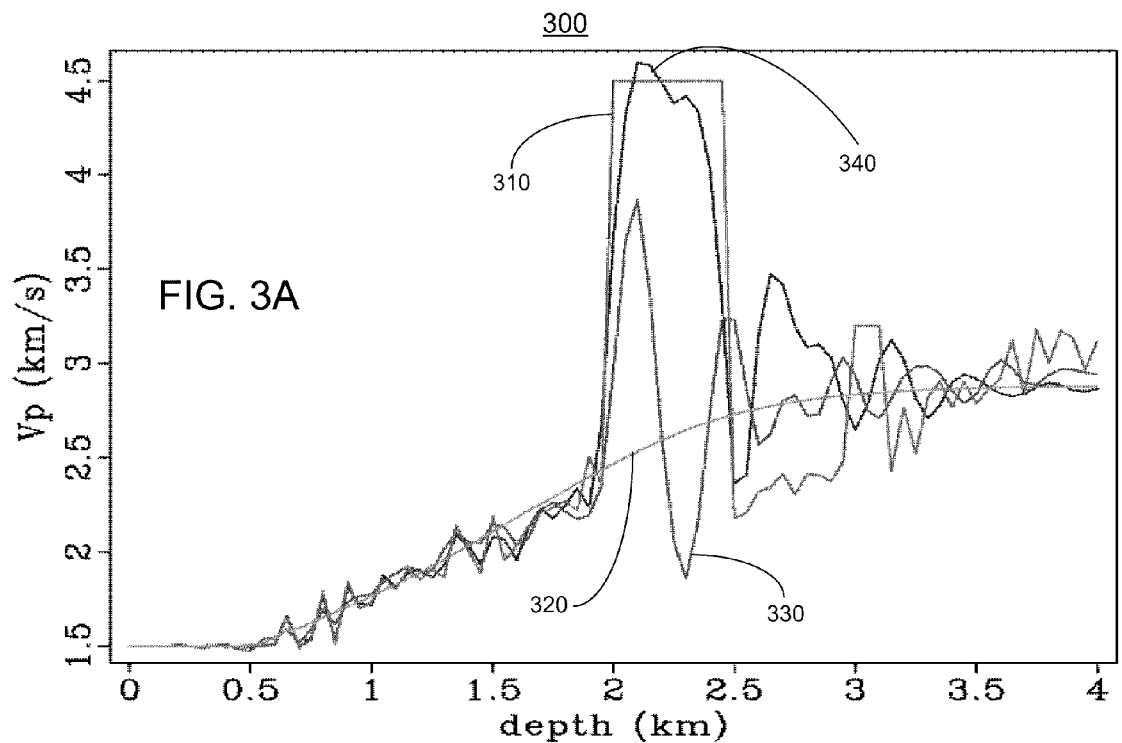
FIG. 3A illustrates full-waveform inversion in traveltime results as compared to conventional full-waveform inversion results in accordance with one or more implementations of various techniques described herein.

FIG. 3A illustrates full-waveform inversion in traveltime results as compared to conventional full-waveform inversion results in accordance with one or more implementations of various techniques described herein. In one implementation, line 310 illustrates a true one-dimensional (1D) velocity profile that was used to generate a synthetic shot-gather data via two-dimensional (2D) finite-differences. As such, line 310 represents an ideal model that is to be reconstructed using full-waveform inversion.

Line 320 corresponds to the velocity profile of the earth model 105 as described in FIG. 1. Line 330 represents the updated earth model after 50 iterations using a conventional FWI approach. Line 340 represents the updated earth model after 50 iterations using the FWI in traveltime domain as described in FIG. 1. As indicated in FIG. 3, using the FWI in traveltime domain (line 340) more accurately reconstructs the earth model (line 320) to appear like the true velocity profile (line 310) than the conventional FWI method (line 330).

Figure 3B:
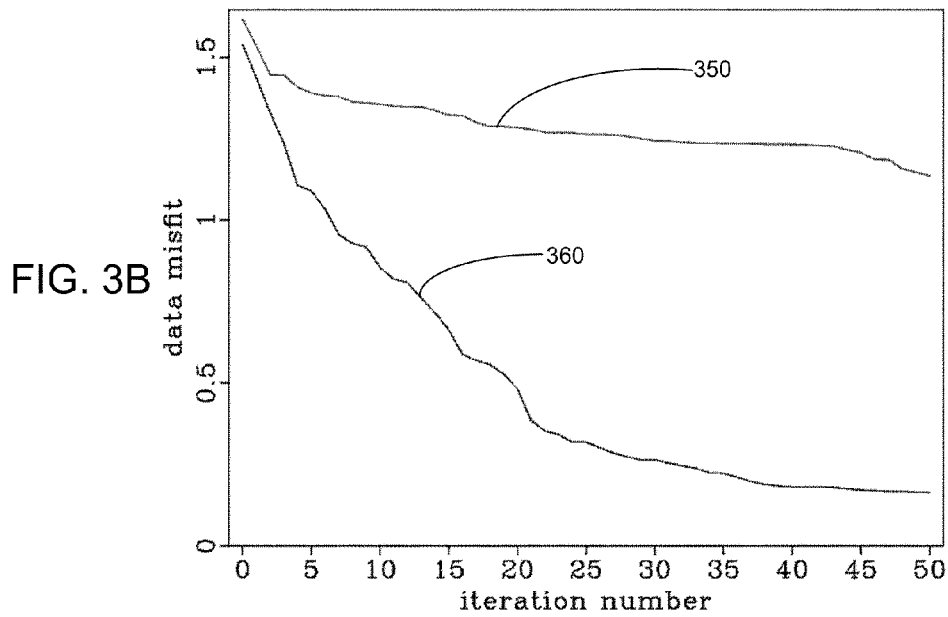
FIG. 3B illustrates the residual errors over the number of iterations from using a conventional FWI process and the residual errors over the number of iterations from using a FWI process in the traveltime domain in accordance with one or more implementations of various techniques described herein.

FIG. 3B illustrates the residual errors over the number of iterations from using a conventional FWI process and the residual errors over the number of iterations from using a FWI process in the traveltime domain in accordance with one or more implementations of various techniques described herein. Line 350 represents the residual errors for a conventional FWI method over the number of iterations. Line 360 represents the residual errors for a FWI method using traveltimes over the number of iterations. As seen from FIG. 3B, the FWI method using traveltimes has significantly lowered residual values than the conventional FWI method. As such, there is a closer fit between the true velocity profile (line 310) and the predicted velocity profile (line 340). The convergence of line 360 is also significantly faster than the conventional FWI method. Therefore, fewer iterations may be required to obtain a more accurate predicted velocity profile.

Figure 4:
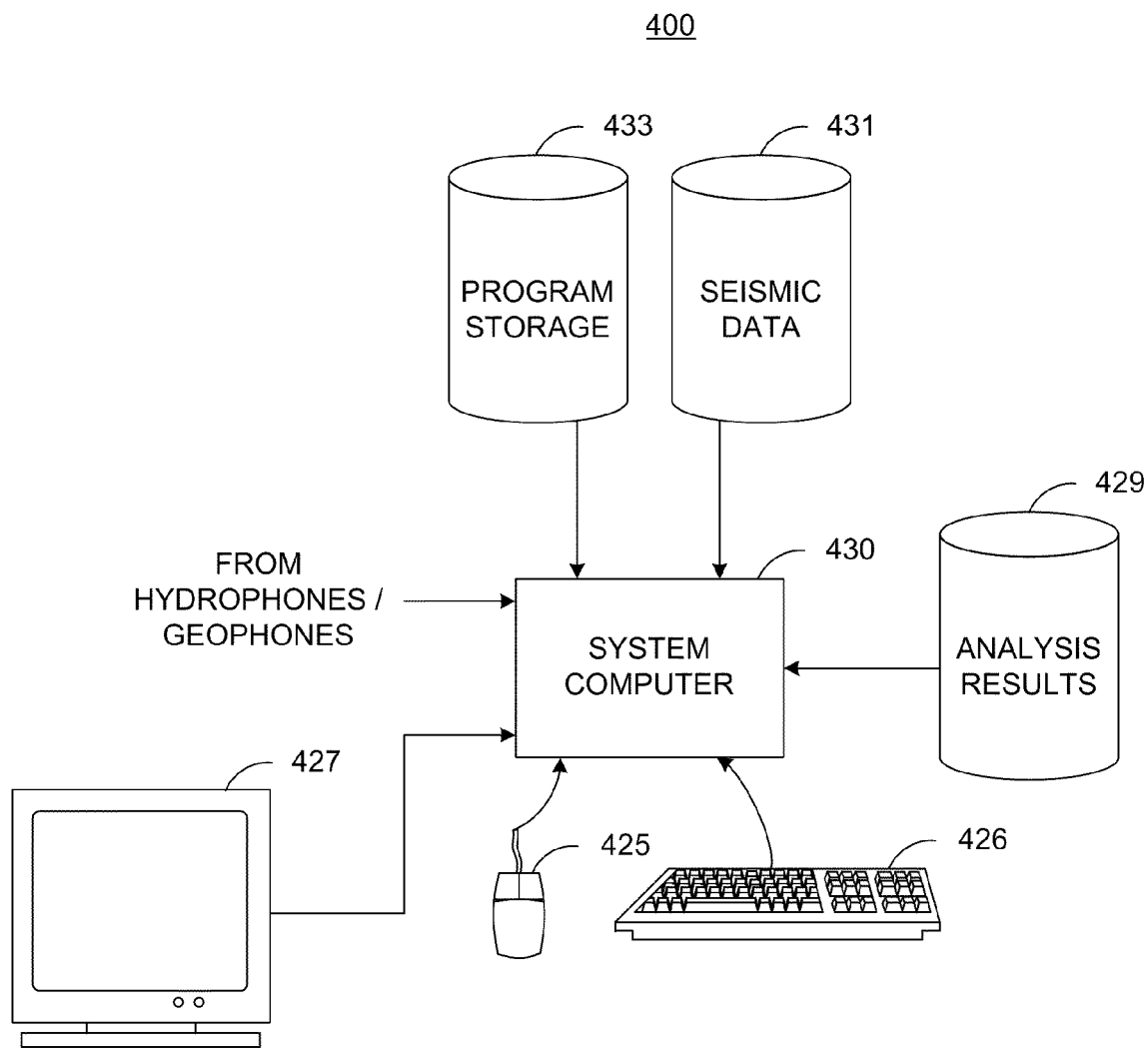
FIG. 4 illustrates a computer network into which implementations of various technologies described herein may be implemented.

FIG. 4 illustrates a computer network 400 into which implementations of various technologies described herein may be implemented. In one implementation, various techniques for performing a full-waveform inversion in the traveltime domain as described in FIGS. 1-2 may be performed on the computer network 400. The computer network 400 may include a system computer 430, which may be implemented as any conventional personal computer or server. However, it should be understood that implementations of various technologies described herein may be practiced in other computer system configurations, including hypertext transfer protocol (HTTP) servers, hand-held devices, multi-processor systems, microprocessor-based or programmable consumer electronics, network PCs, minicomputers, mainframe computers, high-performance clusters of computers, co-processing-based systems (GPUs, FPGAs) and the like.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the receivers may be stored in disk storage device 431. The system computer 430 may retrieve the appropriate data from the disk storage device 431 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 433. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400.

Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. After conventional formatting and other initial processing, these signals may be stored by the system computer 430 as digital data in the disk storage 431 for subsequent retrieval and processing in the manner described above. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
   a) predicting seismic data based on an earth model in traveltime representing seismic properties of subterranean formations in the earth;
   b) determining a difference between seismic data acquired from one or more seismic receivers and the predicted seismic data;
   c) projecting the difference into an earth model descent direction in depth;
   d) projecting the earth model descent direction in depth, using at least one processor, into an earth model descent direction in traveltime; and
   e) updating, using the at least one microprocessor, the earth model in traveltime according to the earth model descent direction in traveltime.

2. The method of claim 1, wherein predicting the seismic data comprises:
   receiving the earth model in traveltime;
   converting the earth model in traveltime into an earth model in depth; and
   simulating seismic data according to the earth model in depth.

3. The method of claim 1, wherein projecting the difference into the earth model descent direction in depth comprises:
   producing the earth model descent direction in depth by cross-correlating a back-propagated wavefield of the difference with a forward-propagated source wavefield.

4. The method of claim 1, wherein updating the earth model comprises:
   determining a distance in a direction to update the earth model in traveltime;
   calculating a product of the distance and the earth model descent direction in traveltime; and
   adding the product to the earth model in traveltime.

5. The method of claim 4, wherein the distance is a step length.

6. The method of claim 4, wherein the direction corresponds to the earth model descent direction in depth.

7. The method of claim 4, wherein determining the distance comprises:
   generating a trial distance;
   calculating a product of the trial distance and the earth model descent direction in traveltime;
   adding the product of the trial distance and the earth model descent direction in traveltime to the earth model in traveltime to create a trial updated earth model;
   predicting trial seismic data according to the trial updated earth model;
   determining a trial difference between the acquired seismic data and the predicted trial seismic data; and
   setting the trial distance to be the distance when the trial difference falls below a predetermined value.

8. The method of claim 1, further comprising iteratively updating the earth model in traveltime until one or more predetermined conditions are met.

9. The method of claim 8, wherein the predetermined conditions comprises:
   reaching a predetermined maximum number of iterations;
   determining that the difference falls below a predetermined value;
   determining that the updated earth model in traveltime is within a specified tolerance of the earth model in traveltime; or
   combinations thereof.

10. The method of claim 1, wherein determining the difference further comprises applying a filter or a window to the acquired seismic data and the predicted seismic data.

11. The method of claim 1, wherein the difference is determined using a least-square method.

12. The method of claim 1, wherein the difference is residual seismic data.

13. The method of claim 1, wherein the seismic data are seismic reflection traveltimes.

14. The method of claim 1, wherein the earth model in traveltime comprises:
   one or more acoustic properties having velocities, densities, or combinations thereof;
   one or more elastic properties having a parameter that is a function of a shear modulus;
   one or more anisotropic properties;
   one or more anelastic properties; or
   combinations thereof.

15. The method of claim 1, wherein the earth model in traveltime comprises one or more parameters describing one or more velocities of seismic wave propagation.

16. The method of claim 15, further comprising updating the parameters at every physical scale represented in the earth model.

17. The method of claim 1, wherein projecting the earth model descent direction in depth comprises translating the earth model descent direction in depth to the earth model descent direction in traveltime.

18. The method of claim 17, wherein translating the earth model descent direction in depth comprises applying an adjoint of a Jacobian of a time-to-depth function to the earth model descent direction in depth, wherein the time-to-depth function converts earth models parameterized by traveltime into earth models parameterized by depth.

19. The method of claim 18, wherein the time-to-depth function is derived from a vertical integration of a vertical seismic traveltime or a zero-offset ray propagation.

20. The method of claim 18, further comprising applying spatial smoothing to the time-to-depth function to stabilize the time-to-depth function in one or more structurally complex areas.

21. A computer-readable storage medium having stored thereon computer-executable instructions which, when executed by a computer, cause the computer to:
   predict seismic data based on an earth model in traveltime representing seismic properties of subterranean formations in the earth;
   determine a difference between seismic data acquired from one or more seismic receivers and the predicted seismic data;
   project the difference into an earth model descent direction in depth;
   project the earth model descent direction in depth into an earth model descent direction in traveltime; and
   update the earth model in traveltime according to the earth model descent direction in traveltime.

22. The computer-readable storage medium of claim 21, wherein the computer-executable instructions which, when executed by the computer, cause the computer to predict the seismic data comprises computer-executable instructions which, when executed by a computer, cause the computer to:
   receive the earth model in traveltime;
   convert the earth model in traveltime into an earth model in depth; and
   simulate seismic data according to the earth model in depth.

23. The computer-readable storage medium of claim 22, wherein the computer-executable instructions which, when executed by the computer, cause the computer to project the difference into the earth model descent direction in depth comprises computer-executable instructions which, when executed by a computer, cause the computer to:
  produce the earth model descent direction in depth by cross-correlating a back-propagated wavefield of the difference with a forward-propagated source wavefield.

24. The computer-readable storage medium of claim 21, wherein the computer-executable instructions which, when executed by the computer, cause the computer to update the earth model in traveltime comprises computer-executable instructions which, when executed by a computer, cause the computer to:
  determine a distance in a direction to update the earth model in traveltime;
  calculate a product of the distance and the earth model descent direction in traveltime; and
  add the product to the earth model in traveltime.

25. The computer-readable storage medium of claim 21, wherein the computer-executable instructions which, when executed by the computer, cause the computer to project the earth model descent direction in depth comprises computer-executable instructions which, when executed by a computer, cause the computer to translate the earth model descent direction in depth to the earth model descent direction in traveltime.

26. A computer system, comprising:
a processor; and
a memory comprising program instructions executable by the processor to:
  predict seismic data based on an earth model in traveltime representing seismic properties of subterranean formations in the earth;
  determine a difference between seismic data acquired from one or more seismic receivers and the predicted seismic data;
  project the difference into an earth model descent direction in depth;
  project the earth model descent direction in depth into an earth model descent direction in traveltime; and
  update the earth model in traveltime according to the earth model descent direction in traveltime.

27. The computer system of claim 26, wherein the program instructions executable by the processor further comprises program instructions executable by the processor to translate the updated earth model in traveltime to an updated earth model in depth.

28. The computer system of claim 26, wherein the program instructions executable by the processor further comprises program instructions executable by the processor to:
  receive an earth model in depth; and
  transform the earth model in depth into the earth model in traveltime via an inverse of a time-to-depth function.

* * * * *